United States Patent [19]
Cuccia

[11] Patent Number: 6,157,673
[45] Date of Patent: Dec. 5, 2000

[54] FAST EXTRACTION OF PROGRAM SPECIFIC INFORMATION FROM MULTIPLE TRANSPORT STREAMS

[75] Inventor: David W. Cuccia, Hopewell Junction, N.Y.

[73] Assignee: Philips Electronics North America Corp., New York, N.Y.

[21] Appl. No.: 08/773,156

[22] Filed: Dec. 26, 1996

[51] Int. Cl.[7] ................................................. H04N 7/18
[52] U.S. Cl. .................. 375/240; 348/845.1; 348/845.2; 348/845.3; 348/423; 348/467; 348/465
[58] Field of Search ............................ 348/845.1, 845.2, 348/845.3, 423, 461, 467, 465, 10; 370/58.1, 94.3, 94.2; 375/240.26

[56] References Cited

U.S. PATENT DOCUMENTS

| | | | |
|---|---|---|---|
| 4,903,126 | 2/1990 | Kassatly | 358/146 |
| 5,579,308 | 11/1996 | Humpleman | 370/94.3 |
| 5,594,492 | 1/1997 | O'Callaghan et al. | 348/10 |
| 5,600,378 | 2/1997 | Wasilewski | 348/468 |
| 5,742,361 | 4/1998 | Nakase et al. | 348/845 |
| 5,754,651 | 5/1998 | Blatter et al. | 386/83 |
| 5,852,612 | 12/1998 | Kostreski et al. | 348/21 |
| 5,864,358 | 1/1999 | Suzuki et al. | 348/10 |
| 5,894,320 | 4/1999 | Vancelette | 348/7 |
| 5,933,500 | 8/1999 | Blatter et al. | 380/20 |
| 5,966,385 | 10/1999 | Fujii et al. | 370/465 |
| 6,005,562 | 10/1999 | Shiga et al. | 348/6 |

FOREIGN PATENT DOCUMENTS

0566092A2  10/1993  European Pat. Off. .

*Primary Examiner*—Andy Rao
*Attorney, Agent, or Firm*—Jack D. Slobod

[57] ABSTRACT

A decoding system and method for a plurality of transport streams, such as MPEG-2 encoded data streams, in which, in addition to a transport decoder, a predecoder is provided for extracting program specific information (PSI) from the plurality of transport streams. Consequently, in the event of a channel change requiring a different transport stream to be decoded, the PSI is made immediately available to the transport decoder eliminating the delay of waiting for applicable packets in the transport stream to extract the PSI prior to decoding and presenting a program to a user. A fully populated crossbar switch controlled by a micro-controller is used to feed a selected transport stream to the transport decoder and to cause the plurality of transport streams to be successively fed to the predecoder. The extracted PSI may also used by the channel mapping function of the decoding system to maintain a map of channels and associated PSI for the entire plurality of transport streams accessible by the decoding system.

20 Claims, 4 Drawing Sheets

FAST EXTRACTION OF PROGRAM SPECIFIC INFORMATION FROM MULTIPLE TRANSPORT STREAMS

BACKGROUND OF THE INVENTION

1. Field of the Invention

The present invention relates to decoding systems for multiple transport streams, such as MPEG-2 (an international standard originated by the Moving Picture Experts Group) encoded data steams. In its particular respects, the present invention is directed to extraction of program specific information (PSI) from the multiple transport streams, to enable a so-called "channel change".

2. Description of the Related Art

As described in ISO/IEC 13818, a decoding system consisting of an MPEG-2 transport decoder, and elementary stream decoders including at least one MPEG-2 audio decoder and MPEG-2 video decoder may receive MPEG-2 transport streams (bitstreams) from multiple source types and/or multiple service providers. Any one MPEG-2 transport stream may contain multiple programs for presentation to the user. Thus, the action of switching from one program (or "channel") to another (usually described as a "channel change") may or may not necessitate switching from one transport stream source to another.

In the case where the data for the desired new channel is in the transport stream currently being received by the system decoder, the latency between selecting a new channel and displaying the new data to the user is limited only by the ability of the transport decoder and elementary stream decoders to resynchronize to the new data (which can be on a new time base as described in the ISO/IEC 13818 document). This latency should be rather small.

However, where a channel change requires selecting data that is not in the currently used transport stream, but in another transport stream, the latency is much greater. In such a case, the transport stream being fed to the transport decoder must be switched to a new transport stream. When this is done, the transport decoder cannot begin to parse and decode the program from the new transport stream until it has recovered program specific information (PSI) tables from the new stream. Since these tables are not sent frequently in any one transport stream, there can be a large delay in time before PSI table information arrives at the transport decoder for extraction. During this delay, no other decoding can be performed since basic information (such as where data is stored in the new stream, and what type of data is present) about the stream is not available. Thus, a large channel change delay is incurred, which may be long enough to become annoying to the user.

SUMMARY OF THE INVENTION

It is an object of the present invention to provide a decoding system and method in which the latency or delay of a channel change necessitating a change in which transport stream is decoded by the transport decoder is substantially reduced.

Briefly, this object is satisfied by the decoding system comprising, in addition to a transport decoder, a predecoder to access the transport stream sources, particularly those not currently being received by the transport decoder, to extract, store (in an appropriately located memory) and maintain updates on the PSI information from each stream. Then, when a channel change involves a change in transport streams fed to the transport decoder, the stored PSI information relevant to the new transport stream can be immediately supplied (i.e. downloaded) to the transport decoder. With the new PSI tables available immediately, the transport decoder can begin decoding the new bitstream immediately, thereby very substantially reducing the delay between a channel change and the display of new information to the user.

In accordance with the present invention, in order to provide for the selection of the transport stream being fed to the transport decoder and to successively feed the various transport streams to the predecoder (at least those streams not currently being fed to the transport decoder), the transport stream sources are connected to separate inputs of a coupling means, implemented as a fully populated crossbar switch, that can be dynamically reconfigured by a microcontroller connected to a control input thereof. The coupling means has one output connected to the predecoder and one output connected to the transport decoder.

In accordance with another aspect of the present invention, the mapping function (or map means) of the decoder system is augmented to use the PSI information extracted by the predecoder to construct a PSI and channel map for the superset of all transport stream sources connected to the system.

A method in accordance with the present invention comprises decoding data corresponding to a program from a first transport stream, during said decoding, extracting program specific information from a second transport stream, indicating a correspondence between packet ID numbers and data for programs in said stream, and using the extracted program specific information in the event of a channel change necessitating that the second transport stream be decoded. The novel method further comprises extracting program specific information from a third transport stream during the decoding of the first transport stream, and using the extracted program specific information in the event of a channel change necessitating that the third transport stream be decoded.

Other objects, features and advantages of the present invention will become apparent upon perusal of the following detailed description when taken in conjunction with the appended drawing, wherein:

DETAILED DESCRIPTION OF THE PREFERRED EMBODIMENTS

Figure 1:
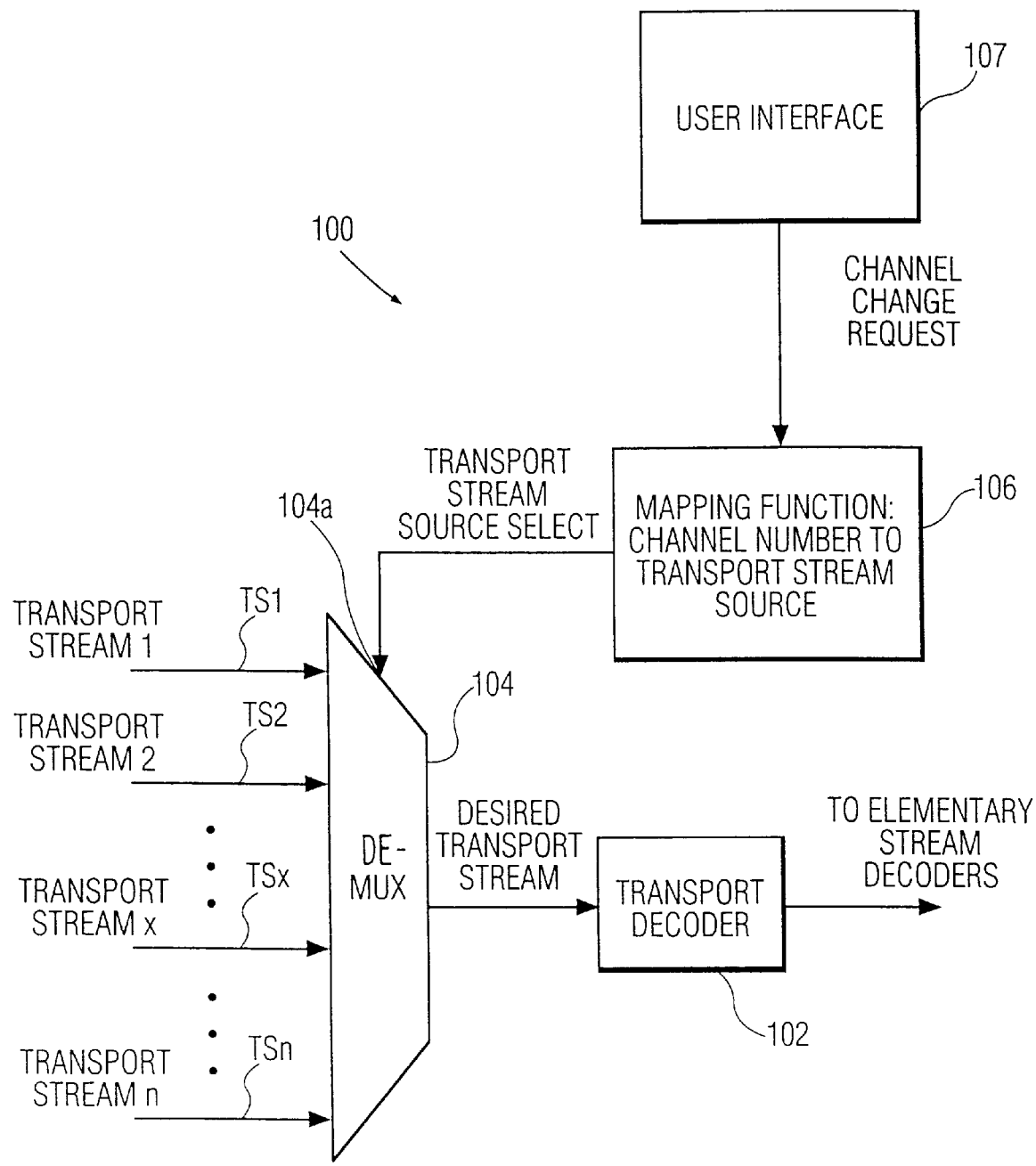
FIG. 1 is a block diagram of a known decoding system for multiple transport streams.

Referring first to FIG. 1 of the drawing, a known decoding system 100 is illustrated for multiple MPEG-2 transport streams TS1–TSn (ISO/IEC 13818-1 bitstreams). These transport streams may be supplied from different source types such as modems, asynchronous transfer mode (ATM) networks, and digital storage media (DSM) (or multiples of each) and/or from different service providers. Further, any one MPEG-2 encoded transport stream may contain multiple programs for presentation to the consumer.

In accordance with the MPEG-2 standard (ISO/IEC 13818), decoding system 100 comprises a transport decoder 102 having an output fed to elementary stream decoders (not shown) including at least one MPEG-2 audio decoder and MPEG-2 video decoder. In the known decoding system 100, transport streams TS1–TSn are applied to a de-multiplexer 104 which in response to a control signal applied to its control input 104a couples a selected one of the transport streams TS1–TSn to the input of transport decoder 102. Control input 104a is fed from a mapping function 106 of the host processor of decoding system 100 (not shown) which maps channel number to transport stream source. Mapping function 106 is accessed in response to a channel change request issued from a user interface function 107 of the host processor. When the data for the new channel is located in the same transport stream as currently fed to the transport decoder 102, no change is made in the signal coupling state of the de-multiplexer 104. However, when data for the new channel is in another transport stream, the control signal applied to control input 104a causes multiplexer 104 to assume a different signal coupling state so that the new transport stream is input to transport decoder 102. At this point, the action of the decoder requires the extraction of program specific information (PSI) from the transport stream newly applied to the transport decoder. In order to understand the nature and time delay inherent in this extraction, the structure of packets in the transport stream will now be discussed.

Figure 3:
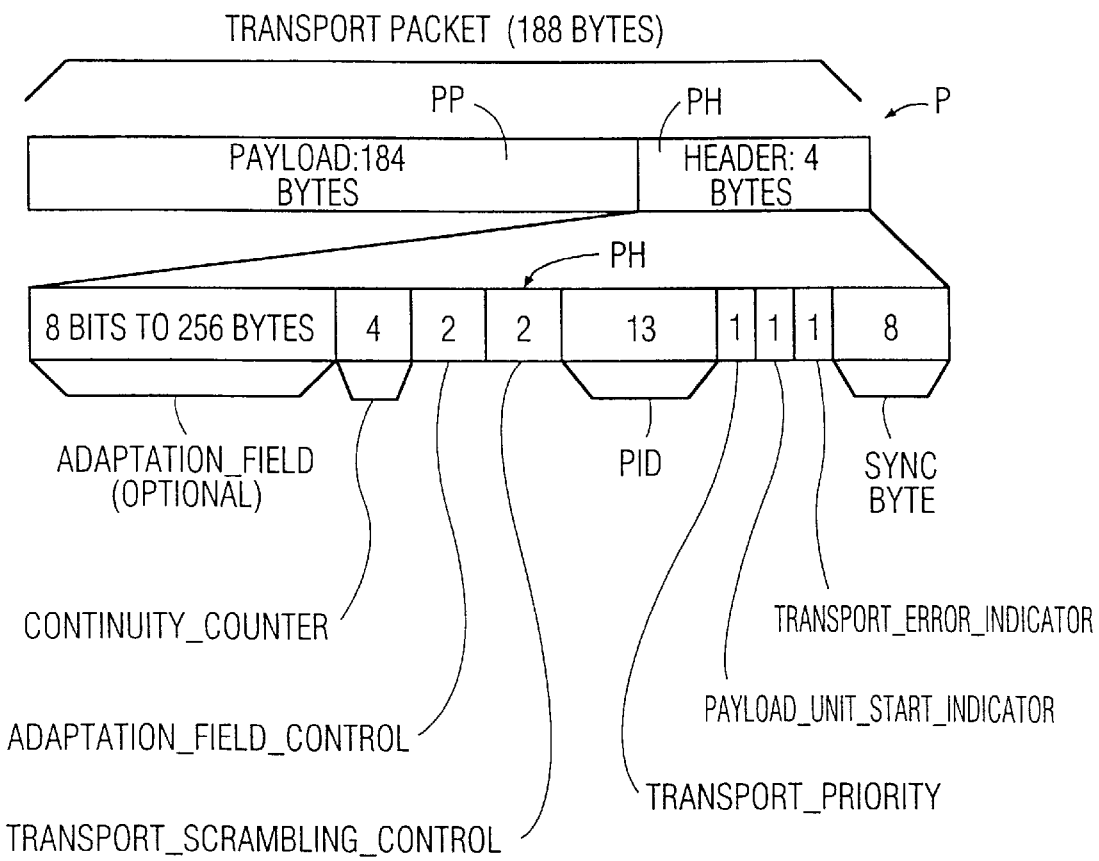
FIG. 3 illustrates the structure of a packet within a transport stream.

As shown in FIG. 3, each transport packet P in an MPEG-2 transport stream is 188 bytes in length and is composed of a packet header PH and a packet payload PP. When no adaptation field is present in the packet header PH, it is 4 bytes in length and the packet payload PP is 184 bytes in length. Within each header PH is a 13 bit packet identification number or PID. Packets containing data for a desired elementary stream or streams corresponding to a channel will have a unique PID which the transport decoder must demultiplex from the transport stream. However, a priori, the transport decoder has no knowledge of the specific PIDs it needs to read in the newly inputted transport stream to demultiplex the desired channel. It obtains this knowledge by extracting program specific information from the transport stream, which can involve a significant delay, on the order of seconds, which may be annoying to the user.

Figure 4:
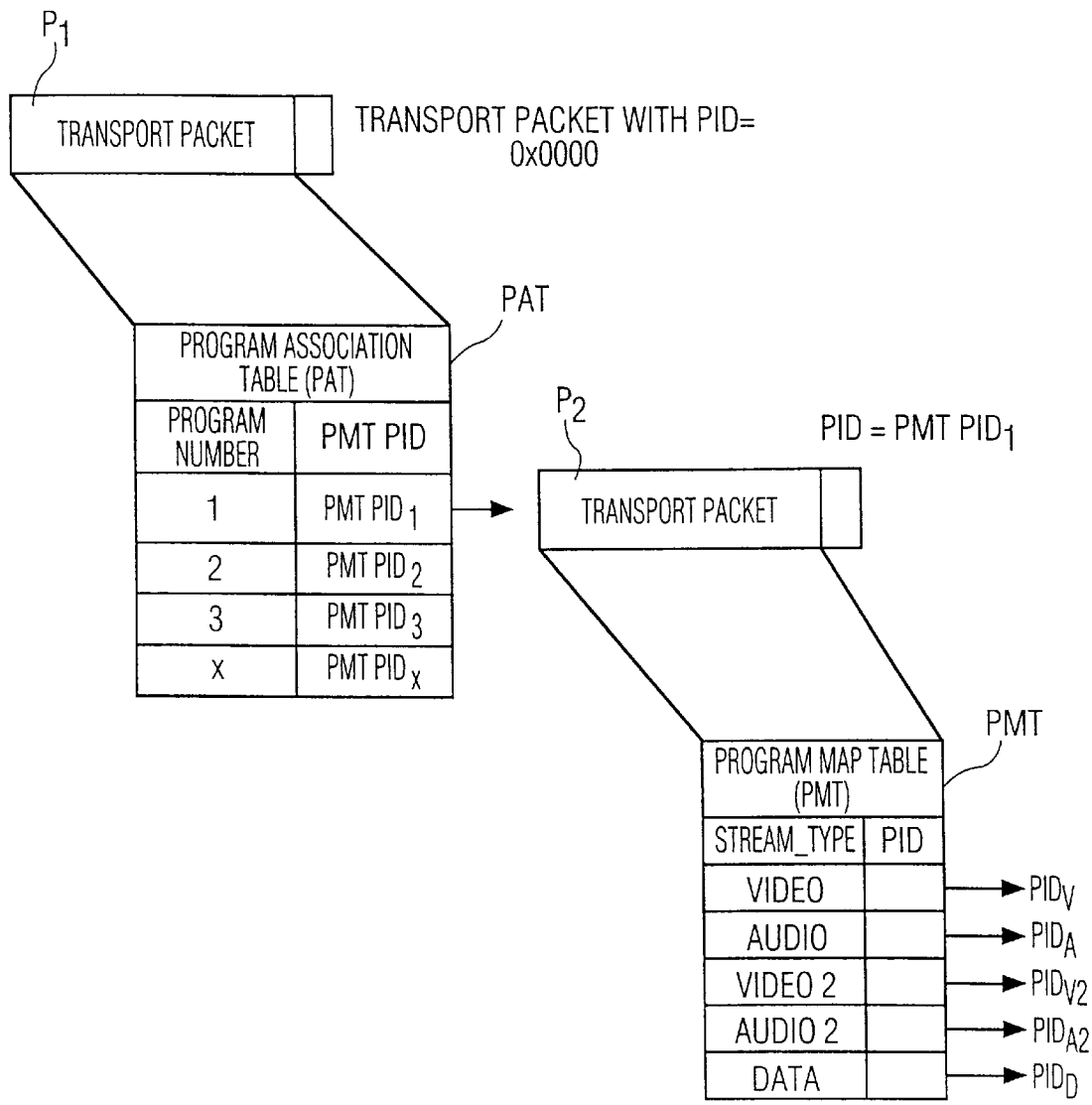
FIG. 4 is a chart illustrating steps in obtaining program information from packets of a transport stream.

The cause for this delay will be understood with reference to FIG. 4 which illustrates in a simplified form the steps for extraction of program specific information. As shown therein, the transport decoder must first wait for a transport packet P1 having the reserved PID 0x0000 for a packet which contains the Program Association Table (PAT). This table essentially relates program number to PIDs of packets containing a Program Map Table (PMT) for that program. A Program Map Table essentially relates the elementary stream types (video, audio, data etc.) in a program to PIDs of packets containing data for that stream type. Once the PID of the desired PMT is known, the transport decoder must wait for a packet P2 having that PID. Then, packet P2 is read to determine the PIDs of the desired stream types. Thereafter, with the acquired knowledge of the PIDs for the desired program elementary stream or streams, the data is demultiplexed and supplied to the elementary stream decoders.

It should further be understood that the Program Association Table and the Program Map Table are not necessarily wholly contained in single transport packets. In fact, they may be spread over multiple packets. Further, the transport packets containing table sections of the PAT and the PMT are typically spread over the transport stream; i.e. the transport packets containing these table sections do not arrive at the transport decoder immediately following one another, but rather arrive with many transport packets between successive PAT and PMT packets. In the worst case the PAT and then the PMT must be extracted and completely assembled from their respective sections spread over multiple packets before the desired program elementary streams can be accessed, resulting in excessive delay on the order of seconds in response to a channel change request necessitating a change in transport stream to be applied to the transport decoder.

Figure 2:
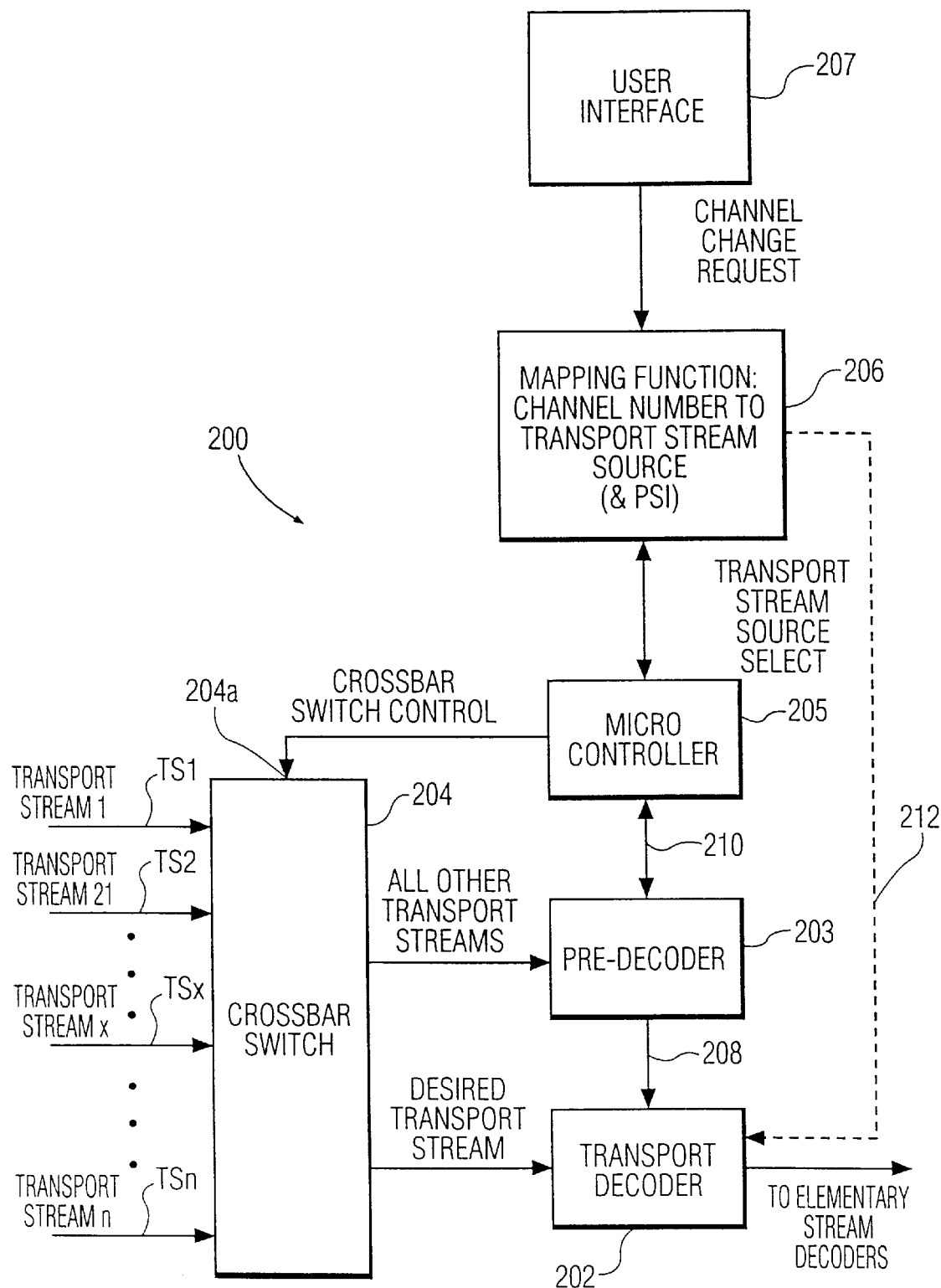
FIG. 2 is a block diagram of a decoding system for multiple transport streams in accordance with the invention.

In accordance with the present invention, as illustrated in FIG. 2, a decoding system 200 is provided in which the delay in obtaining program specific information upon a channel change necessitating a change in transport stream is avoided. Therein, in addition to a transport decoder 202, a predecoder 203 is provided for extracting program specific information PSI from the transport streams TS1–TSn, and at least from all of the transport streams thereof not currently coupled to the transport decoder 202. The program specific information extracted by the predecoder 203 is then immediately made available to the transport decoder 202 via an interconnection 208 between them in the event of a channel change request from user interface 207 necessitating a change of the transport stream fed to transport decoder 202.

Both the coupling of a selected one of transport streams TS1–TSn to the input of transport decoder 202 and the successive coupling of the transport streams TS1–TSn to the input of predecoder 203 is preferably effected by a fully populated crossbar switch 204 which is dynamically reconfigurable in response to a control signal on its control input 204a from an 8-bit micro-controller 205. Crossbar switch 204 has inputs for the respective transport streams TS1–TSn and outputs to the transport decoder 202 and the predecoder 203. It should be understood that any dynamically reconfigurable one or more switch means which can attain the requisite signal coupling states can be used.

Predecoder 203 and micro-controller 205 are coupled by a bidirectional signal path 210 so that the micro-controller can inform the predecoder 203 which transport stream it has commanded the crossbar switch to convey to the predecoder and so that the predecoder can signal the micro-controller when it has completed extraction of program specific information from the newly coupled transport stream. Then, the micro-controller commands the crossbar switch 204 to feed a different transport stream to the predecoder for the purpose of extraction of PSI. The changing of transport streams in this manner is repeated in "round robin" fashion so that the entire plurality of transport streams TS1–TSn are successively applied to predecoder 203, enabling continual extracting and updating of program specific information for all transport streams. The signal paths 210 and 208 are also used for the micro-controller 205 to inform the predecoder 203 and the predecoder to inform the transport decoder 202 which transport stream is currently being supplied to the transport decoder.

The predecoder may itself store program specific information for the plurality of transport streams TS1–TSn or that information may be conveyed for storage to other elements, e.g. micro-controller 205 or transport decoder 202. In an interesting case, the extracted PSI is conveyed via micro-controller 205 to the mapping function 206 of the host processor of decoding system 200 where it is used to store and maintain a global map of channel numbers to transport stream and associated PSI. Then, when a channel change request is issued from the user interface function 207 of the host processor, the applicable program specific information can be read from mapping function 206 and conveyed to transport decoder either via micro-controller 205 and predecoder 203 or directly via path 212.

While the present invention has been described in particular detail, it should also be appreciated that numerous modifications are possible within the intended spirit and scope of the invention. For example, elements of decoding system 200 may be integrated in a variety of ways with each other and communication between these elements may take various direct or indirect routes.

What is claimed is:

1. A decoding system for a plurality of transport streams comprising:

a transport decoder for de-multiplexing data for at least one elementary stream corresponding to a program from a currently accessed transport stream of said plurality of transport streams and decoding the de-multiplexed data;

a predecoder for extracting program specific information from another transport stream of said plurality of transport streams during said de-multiplexing of the data from the currently accessed transport stream by the transport decoder, said program specific information indicating a correspondence between packet ID numbers and data for programs in said another transport stream;

means for coupling a selected one of said plurality of transport streams to said transport decoder and another of said plurality of transport streams to said predecoder; and means for providing the transport decoder with the program specific information extracted by the predecoder for use in an event of a channel change necessitating the coupling means coupling said another of said plurality of transport streams to said transport decoder.

2. A decoding system as claimed in claim 1, wherein said coupling means has a plurality of inputs, each for a different one of said plurality of transport streams, and two outputs, one coupled to the transport decoder and the other coupled to the predecoder.

3. A decoding system as claimed in claim 2, wherein said coupling means is configured for successively coupling at least all other of said transport streams to said predecoder.

4. A decoding system as claimed in claim 2, wherein said coupling means is a fully populated cross bar switch having a control input, and further comprising a control means coupled to said control input.

5. A decoding system as claimed in claim 1, further comprising means for constructing a map of channels and program specific information associated with channels using the program specific information extracted by said predecoder.

6. A decoding system as claimed in claim 2, further comprising map means for maintaining a map of channels and program specific information associated with channels using the program specific information extracted by said predecoder.

7. A decoding system as claimed in claim 3, further comprising map means for maintaining a map of channels and program specific information associated with channels using the program specific information extracted by said predecoder.

8. A decoding system as claimed in claim 4, further comprising map means for maintaining a map of channels and program specific information associated with channels using the program specific information extracted by said predecoder.

9. A decoding system as claimed in claim 1, wherein said means for providing the transport decoder with the program specific information extracted by the predecoder includes said map means.

10. A decoding system as claimed in claim 6, wherein said means for providing the transport decoder with the program specific information extracted by the predecoder includes said map means.

11. A decoding system as claimed in claim 7, wherein said means for providing the transport decoder with the program specific information extracted by the predecoder includes said map means.

12. A decoding system as claimed in claim 4, wherein said means for providing the transport decoder with the program specific information extracted by the predecoder includes said map means.

13. A decoding system as claimed in claim 5, wherein said means for providing the transport decoder with the program specific information extracted by the predecoder includes said map means.

14. A decoding system as claimed in claim 6, wherein said means for providing the transport decoder with the program specific information extracted by the predecoder includes said map means.

15. A decoding system as claimed in claim 7, wherein said means for providing the transport decoder with the program specific information extracted by the predecoder includes said map means.

16. A decoding system as claimed in claim 8, wherein said means for providing the transport decoder with the program specific information extracted by the predecoder includes said map means.

17. A method of decoding a plurality of transport streams comprising:

de-multiplexing data for at least one elementary stream corresponding to a program from a currently accessed first transport stream of said plurality of transport streams and decoding the de-multiplexed data;

during said de-multiplexing, accessing and extracting program specific information from a second transport stream of said plurality of transport streams, indicating a correspondence between packet ID numbers and data for programs in said second transport stream; and using the extracted program specific information in an event of a channel change necessitating that data for at least one elementary data stream corresponding to a program in said second transport stream be de-multiplexed.

18. A method of decoding as claimed in claim 17, further comprising:

extracting program specific information from a third transport stream of said plurality of transport streams during the decoding of the first transport stream; and using the extracted program specific information in the event of a channel change necessitating that said third transport stream be decoded.

19. A method of decoding as claimed in claim 17, further comprising maintaining a map of channels and program specific information for the plurality of transport streams using the extracted program specific information.

20. A method of decoding as claimed in claim 18, further comprising maintaining a map of channels and program specific information for the plurality of transport streams using the extracted program specific information.

\* \* \* \* \*